(12) United States Patent
Mohali et al.

(10) Patent No.: US 11,102,345 B2
(45) Date of Patent: Aug. 24, 2021

(54) METHOD FOR QUALIFYING THE IDENTITY OF A CALLER TERMINAL

(71) Applicant: Orange, Paris (FR)

(72) Inventors: Marianne Mohali, Courbevoie (FR); Bertrand Bouvet, Perros Guirec (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/305,846

(22) PCT Filed: May 29, 2017

(86) PCT No.: PCT/FR2017/051330
§ 371 (c)(1),
(2) Date: Nov. 29, 2018

(87) PCT Pub. No.: WO2017/207905
PCT Pub. Date: Dec. 7, 2017

(65) Prior Publication Data
US 2019/0306308 A1    Oct. 3, 2019

(30) Foreign Application Priority Data

May 31, 2016  (FR) ...................... 1654901

(51) Int. Cl.
*H04M 1/56* (2006.01)
*H04M 15/06* (2006.01)
(Continued)

(52) U.S. Cl.
CPC ......... *H04M 3/42042* (2013.01); *H04M 1/57* (2013.01); *H04M 3/42059* (2013.01)

(58) Field of Classification Search
None
See application file for complete search history.

(56) References Cited

U.S. PATENT DOCUMENTS 8,290,130 B2* 10/2012 Cheon ................... H04M 3/436
  379/142.05
8,817,961 B1* 8/2014 Sterman ............ H04M 3/42042
  379/142.05
(Continued)

FOREIGN PATENT DOCUMENTS

EP     1 294 157 A2    3/2003
WO   WO 2016/072736 A1   5/2016

OTHER PUBLICATIONS

International Search Report and Written Opinion dated Sep. 22, 2017 for Application No. PCT/FR2017/051330.

*Primary Examiner* — Quoc D Tran
(74) *Attorney, Agent, or Firm* — Knobbe, Martens, Olson & Bear, LLP

(57) ABSTRACT

A method for qualifying identity in a communication network upon initiation by caller terminal of a communication to a called terminal is described. The method is performed by the called terminal and includes receiving at least one identity of the calling terminal certified by a trusted third-party, as well as at least one non-certified identity of the calling terminal, and presenting the user of the called terminal with information representative of at least one of the identities of the calling terminal, accompanied by an indication representative of a qualification information indicating whether the at least one identity of the calling terminal is or is not certified by a trusted third party.

15 Claims, 2 Drawing Sheets

(51) Int. Cl.
  *H04M 3/42*   (2006.01)
  *H04M 1/57*   (2006.01)

(56) References Cited

U.S. PATENT DOCUMENTS

| | | | |
|---|---|---|---|
| 9,288,062 B2 * | 3/2016 | Feltham | H04L 63/0414 |
| 10,149,156 B1 * | 12/2018 | Tiku | H04L 9/3271 |
| 10,674,009 B1 * | 6/2020 | Jakobsson | H04W 4/14 |
| 2007/0121583 A1 * | 5/2007 | Wing | H04M 7/0024 |
| | | | 370/352 |
| 2008/0084975 A1 | 4/2008 | Schwartz | |
| 2008/0181379 A1 * | 7/2008 | Chow | H04L 63/0823 |
| | | | 379/142.05 |
| 2011/0211572 A1 * | 9/2011 | Campion | H04L 12/66 |
| | | | 370/352 |
| 2015/0131478 A1 * | 5/2015 | Bouvet | H04W 8/005 |
| | | | 370/254 |
| 2015/0236857 A1 | 8/2015 | Feltham et al. | |
| 2016/0366276 A1 * | 12/2016 | Bouvet | H04M 3/42059 |

* cited by examiner

```
Session Initiation Protocol (INVITE)
  Request-Line: INVITE sip:+33296092334@172.20.33.195:5060 SIP/2.0
    Method: INVITE
    Request-URI: sip:+33296092334@172.20.33.195:5060
    [Resent Packet: False]
  Message Header
    Via: SIP/2.0/UDP 172.20.193.67:5060;branch=z9hG4bKceb44t20a0i0dekln540.1
    To: "De 092334"<sip:+33296092334@sip.france.fr>
    From: "De 100432"<sip:02961004328sip.france.fr;user=phone>;tag=50g4ffe01-255055905-1268331609345-
      Call-ID: 50g4ffe01-646301228c818db9bbaf33e54ab04aff-c552s51
    CSeq: 658128513 INVITE
    Max-Forwards: 8
    Content-Length: 257
    Contact: <sip:02961004320172.20.193.67:5060;transport=udp>
    Content-Type: application/sdp
    Allow: ACK, BYE, CANCEL, INFO, INVITE, OPTIONS, PRACK, REFER, NOTIFY, UPDATE
    Accept: multipart/mixed
    Accept: application/media_control+xml
    Accept: application/sdp
    P-Asserted-Identity: "De 100432"<sip:+33296100432@sip.france.fr>
    P-Asserted-Identity: "De 100432"<tel:+33296100432>
    Privacy: none
    Session-Expires: 86400
    Min-SE: 86400
  Message Body
```

FIG. 1

```
  Request-Line: INVITE sip:+33780145220@SP.NOKINS.EU;user=phone SIP/2.0
  Message Header
    From: <sip:+33296103701@Q237.SIP.OFR.COM;user=phone>;tag=0500349270014
    To: <sip:+33780145220@SP.NOKINS.EU;user=phone>
    Max-Forwards: 70
    Via: SIP/2.0/UDP 172.20.9.170:5060;branch=z9hG4bK00000080i388/3217338
    Record-Route: <sip:172.20.9.170:5060;transport=UDP;lr>
    Call-ID: 49fR2574918131PQbcQbEfCe@dkQq237.SIP.OFR.COM
    CSeq: 41985 INVITE
    P-Asserted-Identity: <sip:+33296103701@Q237.SIP.OFR.COM;user=phone>
      SIP PAI Address: sip:+33296103701@Q237.SIP.OFR.COM;user=phone
        SIP PAI user Part: +33296103701
        SIP PAI Host Part: Q237.SIP.OFR.COM
        SIP PAI URI parameter: user=phone
    Accept: application/sdp
    Allow: INVITE,ACK,OPTIONS,BYE,CANCEL,PRACK,UPDATE
    P-Charging-Vector: icid-value=4799300104-1215-18495702;icid-generated-at=Q237.SIP.OFR.COM;orig-ioi=SIP.OFR.COM
    P-Early-Media: supported
    Supported: 100rel,precondition,histinfo
    Content-Type: application/sdp
    Contact: <sip:172.20.9.170:5060;transport=UDP>
    Content-Length: 366
  Message Body
    Session Description Protocol
```

FIG. 2

```
⊞ MTP 3 User Adaptation Layer
⊞ Signalling Connection Control Part
⊞ Radio Access Network Application Part
⊞ GSM A-I/F DTAP - Setup
  ⊞ Protocol Discriminator: Call Control; call related SS messages (3)
    00.. .... = Sequence number: 0
    ..00 0101 = DTAP Call Control Message Type: Setup (0x05)
  ⊞ Bearer Capability 1 - (Full rate support only MS/fullrate speech version 1 supported)
  ⊞ Progress Indicator
  ⊞ Calling Party BCD Number - (3329610370I)
    Element ID: 0x5c
    Length: 8
    0... .... = Extension: Extended
    .001 .... = Type of number: International Number (0x01)
    .... 0001 = Numbering plan identification: ISDN/Telephony Numbering (ITU-T Rec. E.164 / ITU-T Rec. E.163) (0x01)
    1... .... = Extension: No Extension
    .00. .... = Presentation indicator: Presentation allowed (0x00)
    ...0 00.. = Spare bit(s): 0
    .... ..11 = Screening indicator: Network provided (0x03)
    Calling Party BCD Number: 3329610370I
    BCD Digits: 3329610370I
```

FIG. 3

METHOD FOR QUALIFYING THE IDENTITY OF A CALLER TERMINAL

This application is the U.S. National Phase of Application No. PCT/FR2017/051330 entitled "METHOD FOR QUALIFYING THE IDENTITY OF A CALLER TERMINAL" and filed May 29, 2017, which claims the benefit of French Patent Application No. 1654901, filed May 31, 2016, each of which is incorporated by reference in its entirety.

The invention relates to the general field of telecommunications.

More particularly, it relates to the field of processing the signaling that serves to initiate a communication such as a telephone call, a call passed in the context of a videoconference, an instant message, a short message service (MSM) text message, or a multimedia message service (MMS) message, so as to provide the user of the destination terminal (referred to as the "called party") with information about the initiator of the communication (referred to as the "calling party").

It should be observed that in the context of the present invention, for reasons of concision, the term "terminal" is used to designate any type of fixed or mobile user equipment provided with (or associated with) display means or any other playback means (e.g. sound playback means).

It should also be observed that the present invention applies to a very wide variety of communications networks: for example they may comprise an integrated service digital network (ISDN) or a public switched telephone network (PSTN) or a public land mobile network (PLMN) or indeed an Internet protocol (IP) network.

In particular, it should be recalled that communications services on IT networks are capable of identifying physical or virtual resources by means of character strings such as a uniform resource identifier (URI). The syntax for URIs is defined in document RFC 3986 of the Internet engineering task force (IETF); knowing the URI of a resource makes it possible to obtain the IP address of a piece of equipment in the network of the operator managing the resource. In the present description, the term "URI" is used to designate any type of physical or virtual application resource identifier that is accessible on a network.

Advanced IP networks make use of the so-called "session control" protocols that make it possible to set up, modify, and terminate multimedia sessions. Those protocols make use of so-called "signaling" messages that enable a terminal to request a connection with another terminal, to indicate that a telephone line is busy, to signal that a called telephone is ringing, or indeed to signal that such-and-such a phone is connected to the network and can be reached in such-and-such a manner.

One of the most used session control protocols is session initiation protocol (SIP). The SIP protocol is defined by the IETF in documents RFC 3261, RFC 3265, and RFC 3325, together with their updates. In networks making use of the SIP protocol, such as IP multimedia subsystem (IMS) networks, two types of resource identifier are distinguished: there are identifiers of the "SIP-URI" form as defined in RFC 3261, and there are identifiers of the "tel-URI" form as defined in RFC 3966. An SIP-URI has the form "sip: user@host" (e.g. sip:alice@domain1), where the "host" portion identifies the domain of the operator responsible for the identity represented by the "user" portion. A tel-URI is of the form "tel:telephone_number" (e.g. "tel:+33123456789") with reference to international public telephone numbers, or of the form "tel:telephone_number; phone-context= . . . " (e.g. "tel:0623456789; phone-context=+33") with reference to telephone numbers in a format that is valid only in a more restricted context (in this example, the ten-digit number format "0623456789" is valid only in the numbering plan for France).

In the state of the art, two identities of the calling terminal (sometimes referred to below as the "calling party identities" for reasons of brevity) may be conveyed over an end-to-end communications network, namely:

a so-called "certified" identity when the identity is authenticated by a trusted third party; and a so-called "non-certified" identity when the identity is not authenticated by a trusted third party; a non-certified identity is usually inserted in the signaling by the calling party, e.g. by a terminal or by a private branch exchange (PBX).

For the user of the called terminal and for regulatory services (e.g. responsible for legal interceptions, or call traceability), the network operator in charge of the calling party constitutes a trusted third party suitable for establishing the certified identity and for guaranteeing its content when transmitting such a certified identity by means of the signaling to the calling party. When the certified identity is inserted into the signaling by a service provider of the over-the-top (OTT) type, it is that OTT provider who constitutes the trusted third party: in this respect it should be recalled (cf. Wikipedia) that the term "OTT" is used to designate a service for providing contents on the Internet without the operator of the underlying network connectivity (such as a cable, telephone, or satellite company) participating in monitoring or distributing said content. As another example, a certified identity may be inserted in the call signaling by a trusted third party in the context of a communication of the web real-time communication (WebRTC) type.

As a result, in all communications systems, a certified identity cannot be falsified by the calling party.

By way of example, a certified identity may be inserted in a dedicated field of a signaling message of the communication. Thus, SIP protocol signaling messages include a field known as "P_Asserted_Identity" that contains a certified identity of the calling party in the meaning of the invention.

However that does not mean that the certified identity will necessarily be presented to the users of called terminals. Specifically, in numerous communications systems, the signaling message of the communication also conveys a non-certified identity, and in the context of a service for presenting the number or the identity of the calling party, it is this non-certified identity that is to be presented on the called terminal instead of the certified identity. For example, SIP protocol signaling messages include a "From" field in which the content represents the non-certified identity that is to be presented on the called terminal in the context of a service for presenting the identity of the calling party.

Likewise:

signaling messages in ISDN networks contain a "Calling Line Identifier" that is certified, and a "Additional Identifier" that is declarative, i.e. not certified; and signaling messages in PSTN networks that use the ISDN signaling user part (ISUP) signaling protocol, and also in PLMN networks that use the bearer independent call control (BICC) signaling protocol have a field called "Calling Party Number" that represents an identity for the calling party as provided by the network, which is thus certified, and a field called "Generic Number" or "Additional Calling Party Number" that represents a declarative identity of the calling party, i.e. an identity that is not certified.

In the state of the art, several circumstances exist concerning the treatment of calling party identities.

In a first circumstance, the network delivers both identities of the calling party to the called equipment/terminal: this is typical of SIP/IMS networks.

Nevertheless, in these circumstances, when the called party is compatible with the SIP protocol, it is usually configured in firmware so as to identify only one of those two identities. For example, in France, in response to requests from telephone operators—themselves responding to regulatory requirements set out by the French post and communications regulatory authority (ARCEP), mobile terminals are configured in firmware to display only the non-certified calling party identity.

FIG. 1 shows an SIP INVITE message of an incoming call presented to the SIP stack of a residential gateway. There can be seen the non-certified identity of the calling party (in SIP URI format) in the "From" field, and also, in two formats (SIP-URI and tel-URI), the certified identity of the calling party in the "P-Asserted-Identity" field. It should be observed that in the message of FIG. 1, both identities (certified and non-certified) in SIP-URI format are almost identical, namely "sip:+33296100432@sip.france.fr", nevertheless, in general manner, the certified and non-certified identities of the calling party may very well be quite different.

In France, in a communication over the fixed VoIP network for a residential gateway, both identities of the calling party are supplied to the SIP stack of the gateway, and the gateway is configured to make use only of the non-certified identity of the calling party, e.g.:

when the calling party is an analog telephone terminal connected to the gateway via a foreign exchange station (FXS) interface, the gateway inserts the non-certified identity of the calling party in the "Calling Line Identity" field of the "Call Setup" message generated by interoperation with the V.23 protocol used on the FXS interface;

when the called party is a wireless telephone terminal of the digital enhanced cordless telephone (DECT) wireless telephone terminal, the gateway inserts the non-certified identity of the calling party in the international portable user identity (IPUI) field of the "Call Control Setup" message sent to the DECT base.

Likewise, FIG. 2 shows an SIP INVITE message of an incoming call for a voice over LTE (VoLTE) terminal. In this example, the certified identity of the caller (represented by the content of the "P-Asserted-Identity") field and the non-certified identity of the calling party (represented by the content of the "From" field) are both in the SIP-URI format, and they are identical—but once more, this is not a general requirement.

In a second circumstance, the network delivers only one of the identities of the calling party to the called terminal/ equipment, and it is the operator in charge of the called party who determines which one is selected. This applies in particular to second or third generation (2G or 3G) mobile networks in France.

FIG. 3 shows an incoming call message presented in France to a 2G or 3G mobile terminal by visited mobile switching center (V-MSC) equipment. Such V-MSC equipment receives both identities of the caller from the upstream network; for example, in the ISUP/BICC protocol, the certified identity is contained in the "Calling Party BCD Number" field and the non-certified identity is contained in the "Generic Number" field.

In this example, the "Calling Party BCD Number" field, which always conveys the certified identity of the calling party in the internal network signaling, ends up by conveying the non-certified identity between the V-MSC equipment and the called terminal.

More precisely, the V-MSC equipment applies the following processing procedure:

if the certified identity of the calling party is identical to the non-certified identity of the calling party, then there is no change of identity contained in the "Calling Party BCD Number" field; and if the certified identity of the calling party is different from the non-certified identity of the calling party, the calling signaling then makes use of the "Calling Party BCD Number" field to convey the identity of the calling party to the called terminal; as mentioned above, this field of the "Call Control" protocol (the communications protocol between the V-MSC equipment and the called terminal) is semantically speaking the certified identity (the "screening indicator" information element being set to "network provided"), however since the regulations in France require the non-certified identity of the calling party to be displayed, the V-MSC equipment inserts the non-certified identity of the calling party in the "Calling Party BCD Number" field that is transmitted to the called terminal.

Both of the above-described circumstances show that it is often the non-certified identity and only the non-certified identity that is displayed on the called terminal when the identity of the calling party is presented; as mentioned above, this applies in particular in France (because of a regulation that requires call centers providing a telemarketing service to insert in the non-certified identity the identity of the third party business on behalf of which a call center is calling, so that the called party can subsequently make contact with that third party business). Furthermore, the non-certified identity may be more understandable and usable for a user, e.g. in order to be able to call back a calling party in a business without having to go through the business switchboard.

In contrast, that French regulation is unfortunate in the present context where the number of undesirable calls on fixed and mobile networks is continually increasing, in particular because of telephone marketing.

Specially, telephone subscribers in France are frequently harassed by call centers located aboard, those centers making use of the fact that only the non-certified identity of the calling party is presented on the called terminals. Those call centers have no hesitation in inserting in the non-certified identity of the calling party a calling party number in the fixed numbering plan in France (beginning with 01 or 02 or 03 or 04 or 05), and they even adopt additional strategies for misleading the called party, for example by using fixed calling party numbers in the same region as the called party, or by usurping telephone numbers that are already allocated to clients of the main operators.

Abusive telemarketing has been taken into account by government authorities in France, e.g. since June 2016 by means of the "Bloctel" service (http://www.bloctel.gouv.fr/), which enables fixed or mobile telephone subscribers to input the fixed or mobile telephone number at which they desire not to be bothered by marketing telephone calls, and call centers are required to consult the Bloctel database before configuring in their telephone equipment (PBX/IPBX) the list of numbers to be called in a marketing campaign.

However the majority of call centers located abroad do not comply with this legal requirement, since in reality it is very difficult to sanction them by applying international law. It is possible for a called party troubled by a malicious call center to declare that center to a public authority (e.g. Bloctel), but since the called party only has the non-certified identity calling party number, it is difficult to identify accurately from where the call originated. The only solution for the called party is to make an official complaint so that the call tickets available with the telephone operator can be used in order to discover the certified identity of the calling party. However, it is difficult, complex, and expensive to lodge a complaint against a third party situated aboard.

It is clear that if it was the certified calling party number that was displayed on called terminals in France for calls from telemarketing call centers located abroad, the called party would be much better able to detect that it is a telemarketing call that is probably of no interest to the called party, who can then not answer or refuse such calls.

Doubtless, that is why most international standards recommend presenting only the certified identity on the called terminal. As a result, commercially-available terminals that are not controlled by a network operator are configured to present the certified identity (only). Nevertheless, standards are changing so as to allow a network operator to configure SIP terminals so that they present their users either with the certified identity or else with the non-certified identity of a calling party to their users.

The present invention thus provides an identity qualification method for use in a communications network, the method comprising the following steps:
 a first terminal, referred to as a calling terminal, initiating a communication to a second terminal, referred to as a called terminal;
 said called terminal receiving in call signaling at least one identity of said calling terminal that is certified by a trusted third party, together with at least one non-certified identity of the calling terminal; and
 the called terminal presenting to its user information representative of at least one of said identities of the calling terminal together with an indicator representative of qualification information whereby said at least one identity of the calling terminal is or is not certified by a trusted third party.

By way of example, said information representative of identity may be a telephone number or a name associated with the telephone number in the list of contacts in the called terminal, or a name supplied by the network via the calling name identification presentation (CNIP) service.

Said indicator whereby the identity of the calling party is or is not certified by the network may conveniently be selected from a very wide variety of forms. In a first example, said indicator may be in the form of a text or a dedicated logo, or of a dedicated color. In a second example, said indicator may be in the form of a ring tone that differs depending on whether the identity of the caller is certified or not certified. In a third example, said indicator may be in the form of activating or not activating a vibrator of the called terminal, depending on whether the identity of the calling party is certified or not certified.

By means of theses provisions, the called party (the user of the called terminal) can distinguish between callers of identity that is completely reliable (certified) and callers for whom there may be some doubt as to their real identity (non-certified/declarative). The called party can then respond appropriately, e.g. by answering or ignoring the call; provision may also be made for incoming calls to be rejected automatically (e.g. configurable by an on/off switch on the terminal) whenever the displayed identity of the calling party is not certified.

It should be observed that the invention is compatible with standards that, as mentioned above, make provision for the terminal of the called party to present the user with only one identity of the calling party, but it also makes it possible to accommodate future standards or national regulations that might enable the terminal of the called party to present its user with both identities of the calling party, and thus with information about the calling party that is more complete.

According to particular characteristics, said method further comprises the following steps:
 the called terminal comparing said certified identity with said non-certified identity of the calling terminal; and
  if the called terminal determines that the certified identity of the calling terminal is identical to its non-certified identity, the called terminal then displaying this identical identity together with an indicator that it is certified; and
  if the called party identity determines that the certified identity of the calling terminal is different from its non-certified identity, the called terminal then displaying both identities, together with a certification indicator accompanying the certified identity and/or a non-certification indicator accompanying the non-certified identity.

By means of these provisions, any risk of confusion for the user of the called terminal is avoided.

Correspondingly, the invention also provides various devices.

Thus, firstly, the invention provides a called terminal possessing means enabling it, on being the destination of a communication initiated by another terminal, referred to as a calling terminal, to:
 receive in call signaling at least one identity of said calling terminal that is certified by a trusted third party, together with at least one non-certified identity of the calling terminal; and
 present to its user information representative of at least one of said identities of the calling terminal, accompanied by an indicator representative of qualification information whereby said at least one identity of the calling terminal is or is not certified by a trusted third party.

According to particular characteristics, said terminal further possesses means for presenting both the certified identity and the non-certified identity of said calling terminal.

According to other particular characteristics, said terminal further possesses means for determining whether said certified and non-certified identities of the calling terminal are identical or not.

Secondly, the invention also provides a core network device comprising means for delivering to a "called" terminal that is the destination of a communication at least one identity of a "calling" terminal that initiated said communication, said identity being certified by a trusted third party, together with at least one non-certified identity of said calling terminal, and means for supplying said called terminal with qualification information enabling the called terminal to determine whether at least one of said identities of the calling terminal is or is not certified by a trusted third party, said means for providing said called terminal with qualification information comprising:
 adding a dedicated prefix or suffix to said at least one identity of the calling terminal in a field provided for conveying an identity of the calling terminal; and/or adding a dedicated extension in a field provided for conveying an identity of the calling terminal; and/or inserting said qualification information in a dedicated signaling field; and/or inserting said at least one identity of the calling terminal in a field selected from among a plurality of fields provided for conveying an identity of the calling terminal, the field being selected as a function of said qualification information.

By way of example, in a 2G or 3G mobile network, this core network device could be V-MSC equipment, as mentioned above.

The advantages made available by those various devices are essentially the same as the advantages made available by the corresponding methods set out briefly above.

It should be observed that it is possible to make these devices in the context of software instructions and/or in the context of electronic circuits.

The invention also provides a system for qualifying identity in a communications network, said system comprising:

at least one terminal as described briefly above; and at least one core network device as described briefly above.

The invention also provides a computer program downloadable from a communications network and/or stored on a computer readable medium and/or executable by a microprocessor. The computer program is remarkable in that it includes instructions for executing steps of the identity qualification method as set out briefly above when it is executed on a computer.

The advantages made available by the computer program are essentially the same as the advantages made available by said method.

Other aspects and advantages of the invention appear on reading the following detailed description of particular embodiments given as non-limiting examples. The description refers to the above-described accompanying figures, in which:

FIG. 1 shows an SIP INVITE message of an incoming call presented to a residential gateway;

FIG. 2 shows an SIP INVITE message of an incoming call presented to a VoLTE terminal; and FIG. 3 shows an incoming call message presented to a 2G or 3G mobile terminal.

As explained above, it is assumed that the called terminal is provided with at least one certified identity and one non-certified identity of the calling party.

By way of example, in a 2G or 3G network, provision may be made for this purpose for the V-MSC equipment to be suitable for sending both identities of the calling party to the called terminal (unlike in the prior art, at least in France). The V-MSC devices then allow both identities of the calling party (as received from upstream via ISUP/BICC) to pass transparently to the called terminal using the call control (CC) protocol. This provision serves advantageously to have operation that is identical between 2G/3G networks and SIP/IMS networks, and thus processing that is identical at the called terminal regardless of the access network being used by that terminal.

It is also assumed that the call network device (e.g. V-MSC equipment in a 2G or 3G mobile network) in charge of delivering both of these identities of the calling party to the called terminal provides "qualification" information enabling the called terminal to determine whether at least one of the identities of the calling party is certified or not certified. By way of example, there follow various possible means for providing such qualification information.

In a first variant, the qualification information is added in a conventional field provided for conveying an identity of the calling party (e.g. the "Calling Party BCD Number" field in a 2G or 3G network), e.g.:

by adding a specific character as a prefix or a suffix to the identity of the calling party (e.g. telephone number) so as to indicate whether the identity is certified or not certified; or by adding an extension: a single bit suffices to specify the qualification of the calling party telephone number, 1=certified, 0=non-certified.

In a second variant, the qualification information is inserted in a signaling field dedicated to performing the present invention.

An advantage of these two variants is that they enable the terminal always to seek the qualification information in the same location in the signaling. Nevertheless, these variants require conventional signaling to be modified, and they thus require modifications to call network devices (that send the signaling) and also to terminals (that receive the signaling).

Thereafter, the called terminal presents its user with at least one of the identities of the calling party, and, as a function of the qualification of that identity as determined in this way, an indicator of the corresponding certification.

In a first implementation of the invention, the called terminal is configured to display only one of the two identities of the calling party (as selected by the operator). This configuration may be in firmware, or it may comprise behavior that is dynamic as a function of information made available to the terminal, e.g. the international identifier of the mobile country code (MCC) and/or the international identifier of the mobile network code (MNC). Under such circumstances:

if it is the non-certified identity that has been selected, the terminal displays the telephone number of the calling party (or the name associated with that telephone number as contained in the address book or as supplied by the network via the CNIP service) together with an indicator that it is non-certified (e.g. orange color); and if it is the certified identity that has been selected, the terminal displays the telephone number of the calling party (or the name associated with that telephone number as contained in the address book or as supplied by the network via the CNIP service) together with an indicator that it is certified (e.g. green color).

In a second implementation, the called terminal is suitable for displaying both identities of the calling party. This second variant makes it possible advantageously to provide the user of the terminal with information that is richer.

Under such circumstances, provision may be made for the terminal to display the certified identity together with an indicator that it is certified, and also the non-certified identity together with an indicator that is not certified. Nevertheless, that could lead to confusion for the user when both identities are identical.

That is why it is preferable to provide a step during which the terminal (assumed to be provided with means appropriate for performing this operation) compares the certified identity with the non-certified identity of the calling party. Thereafter:

if the terminal determines that the certified identity of the calling party is identical to the non-certified identity, then the terminal displays that identity with an indicator that it is certified (e.g. green color); and if the terminal determines that the certified identity of the calling party is different from the non-certified identity, the terminal displays both identities, together with an indicator that it is certified (e.g. green color) accompanying the certified identity and an indicator that it is non-certified (e.g. orange color) accompanying the non-certified identity; nevertheless, under such circumstances, it may suffice to provide the indicator together with only one of the identities, since the other indicator is then implicit.

It should be observed that the invention may be performed within the nodes of communications networks, e.g. in terminals or in core network devices, by using software and/or hardware components.

The software components may be integrated in a conventional computer program for managing a network node. That is why, as mentioned above, the present invention also provides a computer system. The computer system comprises in conventional manner a central processor unit using signals to control a memory, and also an input unit and an output unit. The computer system may also be used to execute a computer program including instructions for performing any of the identity qualification methods of the invention.

Specifically, the invention also provides a computer program that is downloadable from a communications network and that includes instructions for performing steps of an identity qualification method of the invention, when executed on a computer. The computer program may be stored on a computer readable medium and may be executable by a microprocessor.

The program may use any programming language, and be in the form of source code, object code, or code intermediate between source code and object code, such as in a partially compiled form, or in any other desirable form.

The invention also provides a non-removable or a partially or totally removable computer readable data medium that includes instructions of a computer program as mentioned above.

The data medium may be any entity or device capable of storing the program, e.g. the medium may comprise storage means such as a read only memory (ROM), e.g. a compact disk (CD) ROM, or a microelectronic circuit ROM, or magnetic recording means, such as a hard disk, or indeed a universal serial bus (USB) flash drive.

Furthermore, the data medium may be a transmissible medium such as an electrical or optical signal suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the identity qualification methods of the invention.

The invention claimed is:

1. A method performed by a terminal of a communication network, the method comprising:
   receiving in signaling of a communication, the terminal being a destination of the communication, at least one first and one second identities of a terminal initiating the communication, the first identity being certified by a trusted third party and inserted in the signaling by the trusted third party; and
   presenting on a user interface of the terminal information representative of at least one of the first and second identities of the initiating terminal together with an indicator representative of qualification information regarding a certification of the presented identity.

2. The method of claim 1, further comprising:
   when the first identity of the initiating terminal is identical to the second identity of the initiating terminal, displaying the identical identity together with an indicator that the first entity is certified; and
   when the first identity of the initiating terminal is different from the second identity of the initiating terminal, displaying both identities, together with a certification indicator accompanying at least one of the first and second identities.

3. A terminal of a communication network, the terminal configured to:
   receive in signaling of a communication, the terminal being a destination of the communication, at least one first and one second identities of a terminal initiating the communication, the first identity being certified by a trusted third party and inserted in the signaling by the trusted third party; and
   present on a user interface of the terminal information representative of at least one of the first and second identities of the initiating terminal together with an indicator representative of qualification information regarding a certification of the presented identity.

4. The terminal of claim 3, wherein the terminal is further configured to present both the first and second identities of the initiating terminal.

5. The terminal of claim 3, wherein the terminal is further configured to determine whether the first and second identities of the initiating terminal are identical or not.

6. A core network device configured to:
   deliver, to a destination terminal of a communication, in a signaling of the communication, at least one first and second identities of a terminal initiating the communication, the first identity being certified by a trusted third party and inserted in the signaling by the trusted third party; and
   supply the destination terminal with qualification information enabling the destination terminal to determine whether at least one of the identities of the initiating terminal is or is not certified by a trusted third party, supplying the destination terminal with qualification information comprising:
      adding a dedicated prefix or suffix to the at least one identity of the initiating terminal in a field provided for conveying an identity of the initiating terminal;
      adding a dedicated extension in a field provided for conveying an identity of the initiating terminal;
      inserting the qualification information in a dedicated signaling field; or
      inserting the at least one identity of the initiating terminal in a field selected from among a plurality of fields provided for conveying an identity of the initiating terminal, the field being selected as a function of said qualification information.

7. A system for qualifying identity in a communications network, the system comprising:
   the destination terminal of claim 3; and
   a core network configured to:
      deliver, to the destination terminal, the at least one identity of the initiating terminal, the identity being certified and inserted in the signaling by a trusted third party; and
      supply the destination terminal with the qualification information enabling the destination terminal to determine whether at least one of said identities of the initiating terminal is or is not certified by a trusted third party, supplying the destination terminal with qualification information comprising:

adding a dedicated prefix or suffix to the at least one identity of the initiating terminal in a field provided for conveying an identity of the initiating terminal;

adding a dedicated extension in a field provided for conveying an identity of the initiating terminal;

inserting the qualification information in a dedicated signaling field; or inserting the at least one identity of the initiating terminal in a field selected from among a plurality of fields provided for conveying an identity of the initiating terminal, the field being selected as a function of said qualification information.

8. A computer having stored thereon instructions, which when executed by the computer, cause the computer to implement the method of claim 1.

9. A non-transitory computer readable storage medium having stored thereon instructions, which when executed by a processor, cause the processor to implement the method of claim 1.

10. The method of claim 1, further comprising receiving said qualification information in said signaling.

11. The method of claim 10, wherein said qualification information is received in at least one of:

a dedicated prefix or suffix to the presented identity of the initiating terminal in a field provided for conveying an identity of the initiating terminal;

a dedicated extension in a field provided for conveying an identity of the initiating terminal; or a dedicated signaling field.

12. The method of claim 10, further comprising receiving said presented identity in a field selected from among a plurality of fields provided for conveying an identity of the initiating terminal, the field being selected as a function of said qualification information.

13. The terminal of claim 3, wherein the terminal is further configured to receive said qualification information in said signaling.

14. The terminal of claim 13, wherein said qualification information is received in at least one of:

a dedicated prefix or suffix to the presented identity of the initiating terminal in a field provided for conveying an identity of the initiating terminal;

a dedicated extension in a field provided for conveying an identity of the initiating terminal; or a dedicated signaling field.

15. The terminal of claim 3 wherein the terminal is further configured to receive said presented identity of the initiating terminal in a field selected from among a plurality of fields provided for conveying an identity of the initiating terminal, the field being selected as a function of said qualification information.

* * * * *